Dec. 24, 1957  G. HOHWART ET AL  2,817,532
EXPANSION ARBOR WITH INCLINED FLATS
Filed Oct. 20, 1955  3 Sheets-Sheet 1
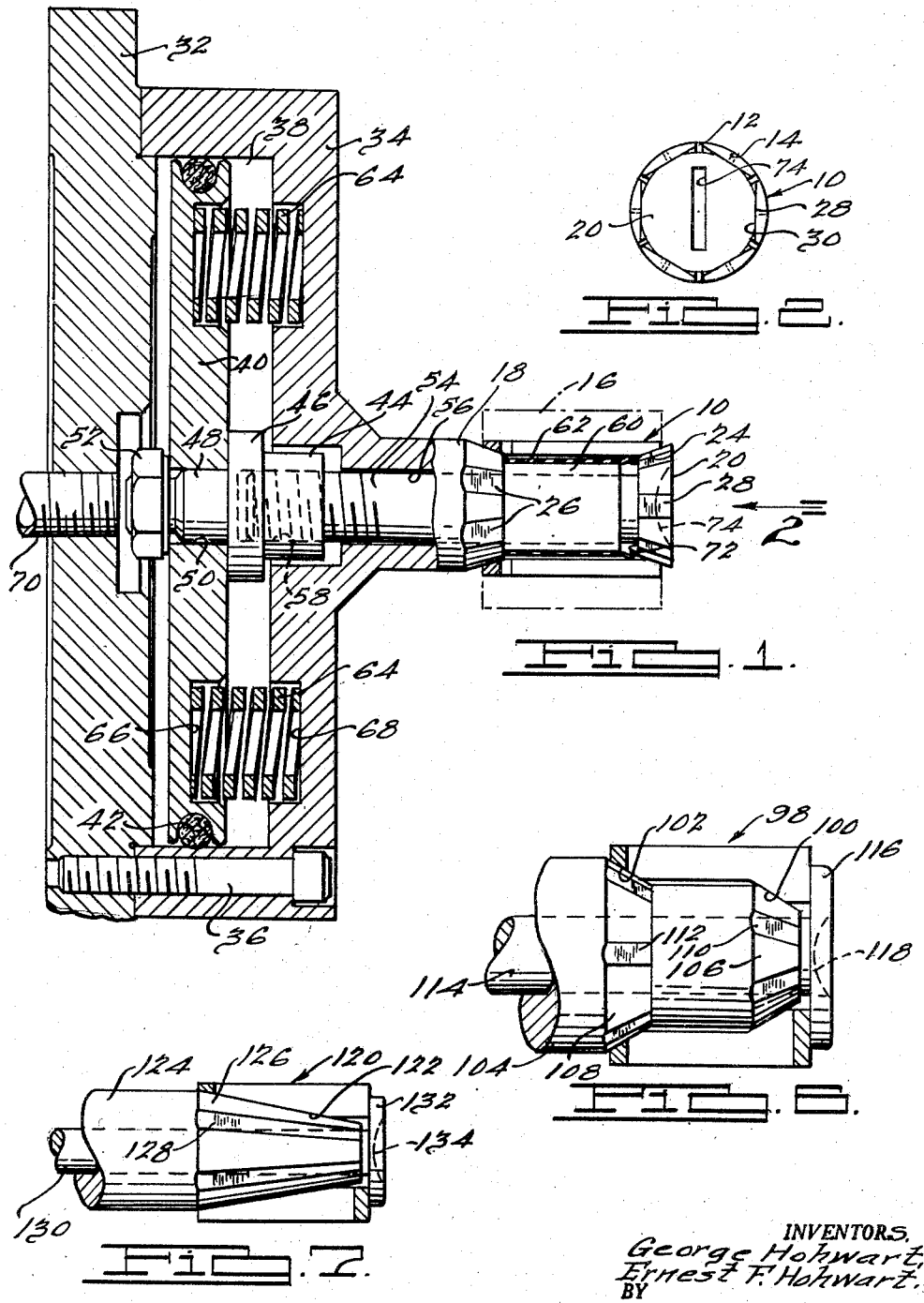
INVENTORS.
George Hohwart,
Ernest F. Hohwart.
BY
Harness, Dickey & Pierce.
ATTORNEYS.

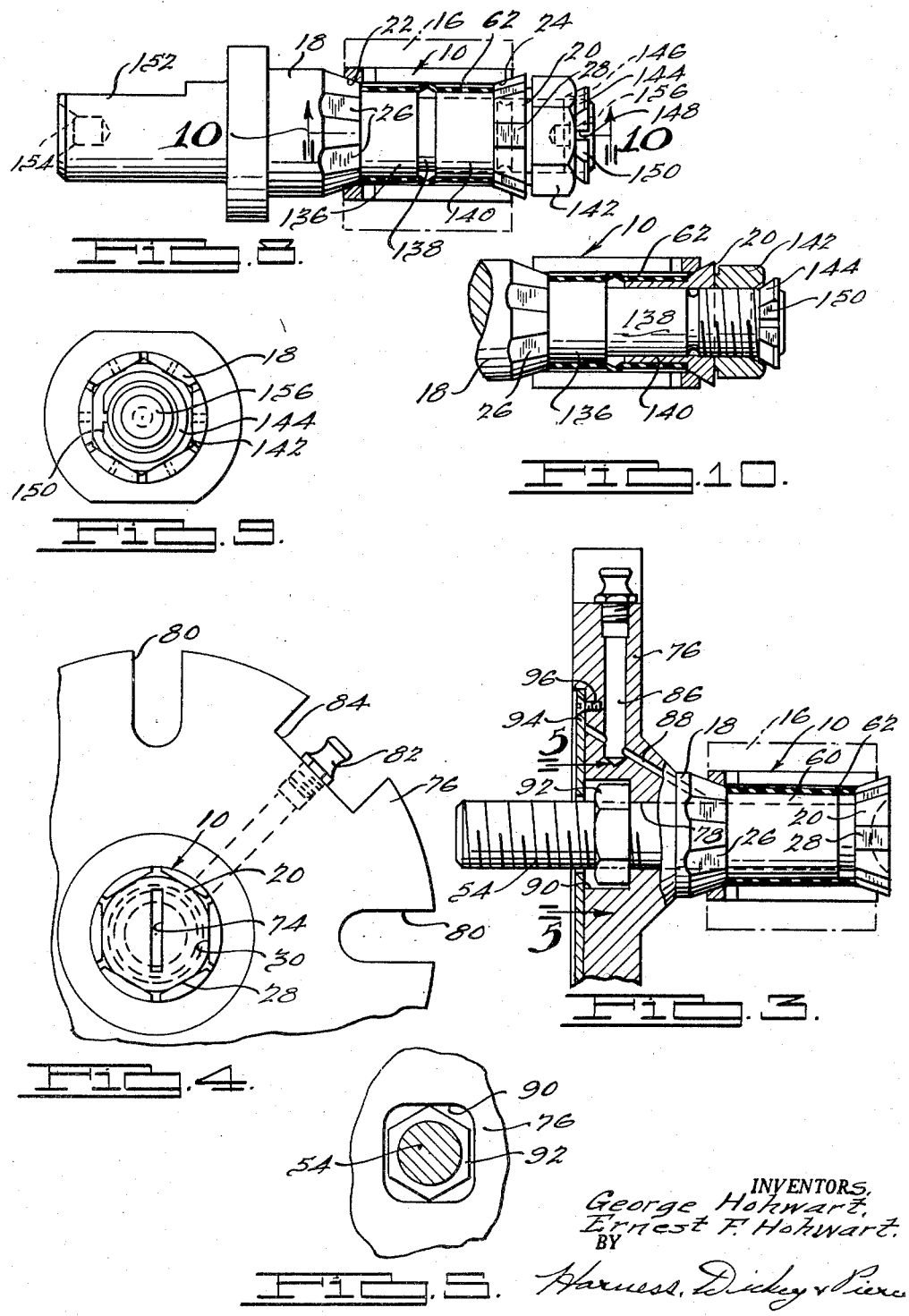

Dec. 24, 1957  G. HOHWART ET AL  2,817,532
EXPANSION ARBOR WITH INCLINED FLATS
Filed Oct. 20, 1955  3 Sheets-Sheet 3
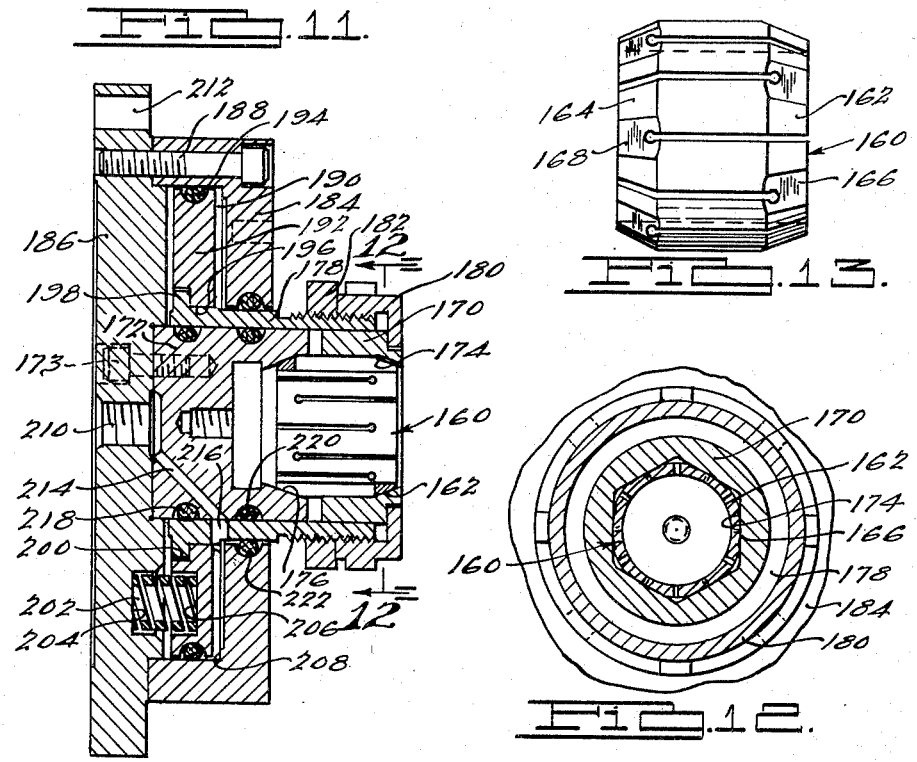
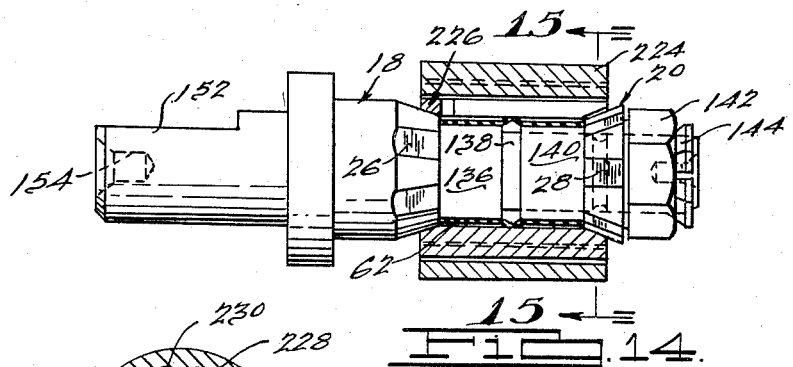
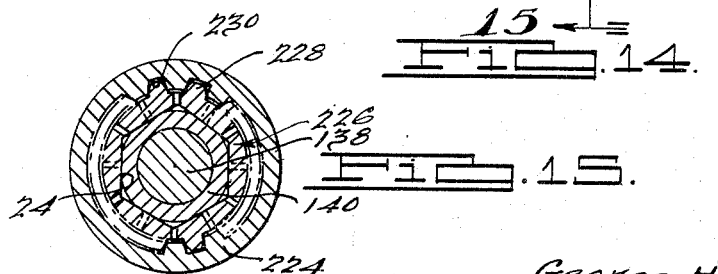
INVENTORS.
George Hohwart,
Ernest F. Hohwart.
BY
Harness, Dickey & Pierce
ATTORNEYS.

United States Patent Office 2,817,532
Patented Dec. 24, 1957

2,817,532

EXPANSION ARBOR WITH INCLINED FLATS

George Hohwart, Farmington Township, Oakland County, and Ernest F. Hohwart, Detroit, Mich., assignors to N. A. Woodworth Company, Ferndale, Mich., a corporation of Michigan Application October 20, 1955, Serial No. 541,633

18 Claims. (Cl. 279—2)

This invention relates to new and useful improvements in expansible, collet chucks.

In the manufacture of collet chucks it has been the practice heretofore to form the collet with tapered conical cam surfaces and to provide an expander having correspondingly tapered pressure-applying parts positioned to engage and movable against the cam surfaces of the collet. In a conventional form of internal collet chuck, for example, the ends of the collet are flared. One end of the collet coacts with a correspondingly tapered stationary pressure member, and the other end of the collet coacts with a correspondingly tapered, movable pressure member. Suitable means such as a drawbar or the like is provided for moving the pressure members toward and from the collet. The drawbar may be actuated in any suitable or conventional manner as by means of a power cylinder attached thereto. In use, the drawbar normally is advanced so that the pressure members disengage or release the collet. When this is done the collet contracts so that a workpiece can be easily slipped onto or removed from the chuck. To clamp a workpiece on the chuck the drawbar is actuated to force the pressure members against the collet so as to expand the same equally from opposite ends into gripping engagement with the workpiece. The collet continues to grip the workpiece as long as the drawbar is retracted and until the latter is advanced to relieve pressure against the collet at which time the collet constricts of its own inherent resiliency and releases the workpiece.

Collet chucks have been popular primarily because they are relatively inexpensive, but it is generally recognized that they are not suitable for precision work, particularly when the chuck is used in high-production operation. In conventional chucks of this type, dirt, dust, chips and the like tend to lodge between the collet and the pressure members because these parts almost never have an area surface contact. If dirt enters at one side of the collet the latter is moved eccentrically with respect to the pressure members; and if the chuck is used in a drilling or turning operation the latter is inaccurate to the extent that the collet is moved off its true axis. Further, if dirt accumulates at only one end of the collet or unevenly at opposite ends of the collet the latter is tilted from its true axis and the workpiece is correspondingly shifted from its true position. As a consequence, of the foregoing it has always been necessary to disassemble and clean collet chucks relatively frequently in order to assure reasonably accurate work. However, even though this is done at regular intervals, collet chucks still produce a relatively large amount of scrap due to workpieces being ruined by shifting or misalignment of the collet in the manner hereinabove described. This situation is particularly aggravated when chucks of this type are used in automatic or semiautomatic machines such as a screw machine or the like, and is still further aggravated by the current trend toward increased automation of machine tools. Also, the line contacts usually obtaining between the collet and its actuators, together with the heavy pressure usually applied to the parts results in rapid wear and a correspondingly short life for the chuck. As a consequence, collet chucks in many instances have been eliminated in favor of other much more expensive types of chucks.

Apparently, the deficiencies and faulty operation of conventional collet chucks are due to the tapered conical form of the bearing surfaces of both the collet and the expanders. As a result of the combined longitudinal taper and transverse curvature of these surfaces, they interfit with an area contact in only one axially adjusted position of the expanders. In this one adjusted position, the expanders fit snugly in the collet and contact the internal bearing surfaces of the latter over their entire area.

If, however, the expanders are moved either inwardly or outwardly from the mating position, the external bearing surfaces thereof no longer have an area contact with the internal bearing surfaces of the collet. The area contact between the elements changes to a line contact, and this accounts for the troubles hereinabove referred to which invariably are encountered in a conventional chuck of the type here under consideration. More specifically, as the expanders are moved inwardly from the mating positions the diameters of the expanders at the points of contact with the collet become progressively larger; and, as a consequence, the expanders disengage the internal bearing surfaces of the collet segments and contact the latter only at the edges thereof. Further, the spacing between the external bearing surfaces of the expanders and the internal bearing surfaces of the collet segments becomes progressively greater as the expanders are advanced. As a result it becomes progressively easier for dirt to enter between the bearing surfaces of the parts. Conversely, as the expanders move outwardly from the mating positions, the diameters of the expanders at the points of contact with the collet becomes progressively smaller; and, as a consequence thereof, the expanders contact the collet segments only at the middle thereof. The entire areas of the collet bearing surfaces at each side of these middle lines are not contacted by the expanders and the spacing between these areas becomes progressively greater as the expanders retract. Manifestly, any increase in the spacing between the bearing surfaces of the parts makes it progressively easier for dirt and other foreign matter to gain access therebetween.

From the foregoing, it will be readily apparent that, as a practical matter, one or the other of the line contact situations obtains between the expanders and the collet substantially all the time and almost invariably in the clamping position of the collet. The maximum pressure of the expanders against the collet obtains in the clamping position, and, under the conditions outlined above, the pressure is concentrated at the lines of contact resulting in rapid wear and frequent damage to the parts. Also, this phenomenon leaves spaces of maximum size between the internal and external bearing surfaces of the collet and expanders when the chuck is in use and when chips or dust is constantly falling onto and around the chuck as work is performed on a workpiece mounted on the chuck. Thus, the worst condition obtains at a time when dirt is most likely to enter the spaces between the bearing surfaces. Foreign matter penetrating between the bearing surfaces is trapped when the chuck is operated to release the work, and as foreign particles accumulate between the bearing surfaces they shift the collet progressively from its initial proper position on the expanders and cause corresponding inaccuracy in work performed on the workpieces.

An important object of the present invention is to provide a collet chuck that is relatively inexpensive to manufacture and which overcomes the primary objections to conventional chucks of this type.

Another object of the invention is to provide a novel collet chuck that positions the work accurately in a much more reliable manner than heretofore and that will not readily get out of adjustment under normal working conditions.

Still another object of the invention is to provide a collet chuck that, under normal conditions of use, will last much longer than heretofore and that will give relatively trouble-free operation during its lifetime.

Other objects and advantages of the invention will be apparent during the course of the following description.

In the drawings forming a part of this specification and wherein like numerals are employed to designate like parts throughout the same;

Fig. 1 is a vertical sectional view showing a collet chuck embodying the invention mounted on and actuated by an air cylinder;

Fig. 2 is an end elevational view of the chuck looking in the direction of the arrow "2" in Fig. 1;

Fig. 3 is a side view, showing parts in section and parts in elevation, of a drawbar-operated collet chuck embodying the invention including a face plate which adapts the chuck for quick attachment to a machine;

Fig. 4 is a fragmentary, end elevational view of the chuck shown in Fig. 3;

Fig. 5 is a fragmentary, transverse sectional view taken on the line 5—5 of Fig. 3;

Fig. 6 is a side view, showing parts in section and parts in elevation, of a modified drawbar-operated collet chuck;

Fig. 7 is a side elevational view, showing parts in section and parts in elevation, of still another modified drawbar-operated collet chuck embodying the invention;

Fig. 8 is a side view, showing parts in section and parts in elevation, of a between-centers type of collet chuck embodying the invention;

Fig. 9 is an end elevational view thereof;

Fig. 10 is a longitudinal sectional view taken on the line 10—10 of Fig. 8;

Fig. 11 is a vertical sectional view showing an internal collet chuck embodying the invention associated with and operated by an air cylinder;

Fig. 12 is a fragmentary, transverse sectional view taken on the line 12—12 of Fig. 11;

Fig. 13 is a side elevational view of the collet used in the modification shown in Fig. 11;

Fig. 14 is a side view, showing parts in section and parts in elevation, of a drawbar-operated collet chuck embodying the invention adapted for chucking an internally splined workpiece; and Fig. 15 is a transverse sectional view taken on the line 15—15 of Fig. 14.

Reference is first had to the form of the invention shown in Figs. 1 and 2 wherein the numeral 10 designates a collet which is conventional to the extent that it comprises a relatively thin tubular member having an annular series of circumferentially equispaced longitudinal partial slots 12 extending from one end and a plurality of similar equispaced slots 14 extending from the opposite end thereof and staggered with respect to the slots 12. All of the slots 12 and 14 are partial slots; viz., they extend only part way along the length of the collet 10, and they mutually co-operate to permit radial expansion and contraction of the latter. Any suitable number of slots 12 and 14 may be provided in the collet 10, and, indeed, the number may vary depending on the exigencies of the particular situation. In the particular form of the invention here shown, the collet 10 is provided with six slots 12 and six slots 14, making a total of twelve slots spaced equally around the collet. A tubular workpiece 16, shown by broken lines in Fig. 1, is slipped onto the collet 10, and means hereinafter described in detail act on the collet to expand the same solidly against the workpiece so as to chuck the latter for a machining or other operation.

A pair of coaxially disposed expanders 18 and 20 are provided at opposite ends of the collet 10 to expand the latter radially into clamping engagement with the workpiece 16. To this end, the collet 10 is provided with outwardly flared, flat, internal cam surfaces 22 and 24 at opposite ends thereof, and the expanders 18 and 20 are provided with complemental, inclined, flat, external pressure surfaces 26 and 28 which engage respective cam surfaces. In this and all other forms of the invention herein described the cam surfaces 22 and 24 preferably are located at the ends of the slots 12 and 14 to assure maximum strength and bearing area and to minimize any tendency for the collet to twist when the expanders are rotated relative to the collet. Thus the cam surfaces 22 are staggered or offset circumferentially with respect to the cam surfaces 24. When the expanders 18 and 20 are moved axially toward each other, the pressure surfaces 26 and 28 press against the cam surfaces 22 and 24 to expand the collet 10 into clamping engagement with the workpiece 16. Conversely, when the expanders 18 and 20 are moved axially away from each other, pressure against the cam surfaces 22 and 24 is relieved, and the inherent resiliency of the collet 10 causes it to contract and to release the workpiece 16. If the expanders 18 and 20 are separated far enough they disengage the cam surfaces altogether, and this frequently is the case in conventional chucks of this kind. However, it is a feature of this invention that the expanders 18 and 20 never entirely disengage the collet 10, and suitable means is provided for preventing this contingency.

Manifestly, the collet 10 chucks the workpiece 16 precisely concentrically with respect to the axes of the expanders 18 and 20 as long as the cam surfaces 22 and 24 of the collet seat solidly on the pressure surfaces 26 and 28. If, however, a dirt particle or other foreign matter gets in between the pressure surfaces 26 and 28 and the cam surfaces 22 and 24 and prevents proper engagement therebetween, the collet 10 and the workpiece 16 carried thereby are disposed eccentrically with respect to the axes of the expanders 18 and 20, and in addition, the axes of the collet and of the workpiece may be inclined in some degree with respect to the axes of the expanders. Manifestly, uniform expansion of the collet 10 in workpiece 16 depends on uniform contact of all pressure surfaces 22 and 24 on all cam surfaces 26 and 28.

According to the present invention, the internal cam surface 24 is formed with an annular series of inwardly inclined, flat surfaces 30, as shown in Fig. 2. Thus, instead of making the cam surfaces 24 conical or frustoconical as heretofore, we grind or otherwise form a flat inwardly inclined surface 30 on each segment of the collet defined by the slots 12. Cam surface 22 at the opposite end of the collet 10 is correspondingly formed with inwardly inclined flat surfaces which extend across the segments defined by the slots 14. The pressure surface 28 of the expander 20 also is formed with an annular series of flat surfaces which correspond in number and arrangement to and complement the surfaces 30, and the pressure surface 26 of the expander 18 is similarly formed with an annular series of flat surfaces which correspond in number and arrangement to and complement the inclined flat surfaces on the cam 22. Thus, each external, flat, inclined surface on the expanders 18 and 20 engages a corresponding internal, flat, complemental surface on the collet 10, and when the expanders are moved toward each other to expand the collet the inclined pressure surfaces of the expanders slide on the mating internal surfaces of the collet. By reason of the fact that the contacting surfaces of the expanders 18 and 20 and of the collet 10 are flat, they remain constantly in engagement over their entire contacting areas, and there is no possibility of dirt getting between the pressure surfaces and the cam surfaces.

The above arrangement and the results achieved are in marked contrast to conventional collet-type chucks wherein the co-operating inclined surfaces of the expanders and of the collet are conical in form. In this conventional construction, each cam surface of the collet seats solidly on the pressure surface of its respective expander in only one axially adjusted position of the expander. As the expanders 18 and 20 move outwardly from the mating position, they engage the segments of the collet only at the edges thereof; and, conversely, as the expanders move inwardly from the mating position, they engage the collet segments only at the middle thereof. In both instances each cam surface is spaced over substantially its entire area from its co-operating pressure surface. In actual practice, the expanders 18 and 20 seldom occupy the mating position, and dirt and grit have free access to the spaces between the cam surfaces and the pressure surfaces. It is this foreign matter lodged in these spaces that causes most of the troubles commonly attributed to collet chucks. These troubles are eliminated by providing the expanders and the collet with co-operating flat inclined surfaces as hereinabove described in connection with the chuck shown in Figs. 1 and 2.

The expanders 18 and 20 can be operated in any suitable or conventional manner to expand and contract the collet 10, and it is contemplated that the chuck be either manually operated or power-operated. In the drawing the expanders 18 and 20 are shown attached to and a part of a power-operated air cylinder. More particularly, the power actuator comprises a backing plate 32 that can be adapted, if desired, for attachment to the spindle or other part of a machine (not shown). A cup-shaped housing 34 is fastened to the backing plate 32 by screws 36 to provide a cylinder 38, and a piston 40 is mounted for reciprocation in the cylinder. A sealing ring 42 surrounding the piston 40 seals the annular space between the periphery of the piston and the annular wall of the cylinder 38 while permitting the piston to travel freely axially in the cylinder. Fastened centrally to the piston 40 is a connector 44 having an annular flange portion 46 which seats rearwardly against the front face of the piston and a rear shank portion 48 which extends through and snugly fits a central opening 50 in the piston. A nut 52 threaded on the projecting end of the shank 48 holds the connector 44 fastened securely to the piston.

In order to adapt the chuck to the power unit, the rear expander 18 is integrally connected to the housing 34 centrally thereof as clearly shown in the drawing. A shank 54 formed as an integral part of the front expander 20 extends rearwardly through and is slidably received by a central opening 56 in the rear expander 18, and the rearwardly projecting end of the shank is threadedly received within an internally threaded socket 58 provided centrally in the connector 44. The rear expander 18 is provided with a forward extension 60 normally disposed within the collet 10 and terminating in proximity to but short of the front expander 20 and the extension also slidably receives the shank 54 and provides additional bearing support therefor. A sleeve 62 of neoprene rubber or the like fits snugly around the extension 60 and butts at its ends against the expanders 18 and 20 to prevent dirt and the like from entering through the slots 12 and 14 in the collet 10 and working into the bearing which supports the shank 54.

From the foregoing it will be apparent that the shank 54 is connected to the piston 40 by the connector 44 so that the front expander 20 is moved to and from the rear expander 18 to expand and contract the collet 10 radially by reciprocation of the piston 40. Further, it will be apparent that the collet 10 is expanded to chuck the workpiece 16 by retraction of the piston 40 and that it is permitted to contract so as to disengage the workpiece by advancement of the piston. The piston 40 normally is held in a retracted position by an annular series of compression springs 64 which are interposed between the piston and the confronting radial wall of the housing 34. The terminal portions of the springs 64 are seated in and retained by opposed sockets 66 and 68 in the piston 40 and housing 34 respectively. Air under pressure admitted into the cylinder 38 behind the piston 40 through a pipe 70 advances the piston against the action of the springs 64 when it is desired to disengage the collet from the workpiece 16. Passage of air through the pipe 70 is controlled by any suitable or conventional valve means. When the supply of air to the cylinder 38 is shut off, the cylinder is simultaneously vented to the atmosphere so that the springs 64 are able to retract the piston 40 and engage the collet with the workpiece 16. Thus, the springs 64 exert a constant uniform pressure against the piston 40 and cause the collet to grip the workpiece with a fixed predetermined force. Air pressure is used only to unchuck the workpiece 16.

Suitable provision is made to limit contraction of the expanders 18 and 20 so as to prevent overstressing of the collet 10 and, conversely, provision also is made to limit separation of the expanders so as to prevent the pressure surfaces 26 and 28 of the expanders from disengaging the co-operating cam surfaces 22 and 24 of the collet. As hereinabove suggested, disengagement of the expanders 18 and 20 from the collet chuck 10 must be avoided; otherwise, dirt and other foreign matter will have access between the co-operating pressure and cam surfaces. These surfaces must be maintained constantly in engagement in order to achieve the primary objectives of the invention. To this end the extension 60 is spaced from the rear annular shoulder 72 of the front expander 20 so as to limit movement of the expanders 18 and 20 toward each other. Manifestly the front expander 20 can move toward the rear expander 18 only until it engages the forward end of the extension 60. In this manner, the extension 60 limits expansion and consequently overstressing of the collet 10. The neoprene sleeve 62 also covers the space between the extension 60 and the shoulder 72 to prevent dirt and grit from lodging therein and affecting the clamping action of the chuck. Separating movement of the expanders 18 and 20 is limited by engagement of the connector flange 46 with the housing 34, and the separating movement permitted is never sufficient to disengage the expanders from the collet. In order to make sure that the collet 10 does not disengage the expanders 18 and 20, the collet is never permitted to contract to a fully relaxed condition. Thus, the collet 10 is still under tension when the connector flange 46 engages the end wall of the cylinder 38. It will be readily apparent in this connection that the radial size of the collet 10 when the connector flange 46 is at the forward limit of its travel must necessarily be less than the diameter of the hole in the workpiece to be chucked. The usual practice in the manufacture of the chuck is to mount the collet 10 on the expanders 18 and 20 and then grind the collet to size with air pressure in the cylinder 38 behind the piston 40 and the latter in the fully advanced position. Thereafter the collet 10 will always contract to the same minimum diameter or size when air under pressure is introduced into the cylinder behind the piston.

By reason of the flat surface contact between the collet 10 and the expanders 18 and 20, the constant radial pressure exerted by the collet on the expanders maintains the shank 54 in threaded engagement with the connector 44. The collet 10 can be turned on the expanders 18 and 20 and, conversely, the expanders 20 can be rotated relative to the collet only by bringing the flat inter surfaces of the collet into engagement with adjacent flat surfaces 26 and 28 of the expanders. It will be readily apparent in this connection that the flat internal surfaces 30 must necessarily expand the collet 10 as they ride over the high points between the adjacent pressure surfaces 26 and 28. Thus, the inherent springiness or resiliency of the collet 10 resists relative turning movement between these parts, and the resistance offered by the collet is sufficient to prevent inadvertent relative movement between the parts.

It is of course necessary to rotate the outer expander 20 relative to the inner expander 18 when the parts are assembled and it may be necessary to rotate the outer expander in a reverse direction to disengage the connector 44 in the event the piston 40 or related parts require servicing or replacement. To this end, the expander 20 is provided with a diametrical kerf or slot 74 into which a screw driver or other suitable tool can be inserted. In practice, the collet 10 can be applied to or removed from the expanders 18 and 20 simply by expanding it radially in any suitable manner.

Figs. 3–5 show the collet chuck adapted for drawbar operation. In this form of the invention the chuck is adapted to be mounted on a machine having a reciprocally driven drawbar and to be connected to the drawbar in such a way that actuation of the latter opens and closes the chuck. In this form of the invention, the drawbar replaces the entire power cylinder assembly used with the first form of the invention.

More particularly, the rear expander 18 is attached to an integral part of a face plate 76, and the shank portion 54 of the front expander 20 extends through a central opening 78 in the face plate. The face plate 76 here shown is generally circular in form, and it is provided at spaced points around its periphery with radial slots 80 which accommodate screws or the like used in fastening chuck to the machine. Also, a lubricant fitting 82 is mounted in a peripheral recess 84 provided in the face plate 76. Lubricant introduced into the fitting 82 traverses passages 86 and 88 to the bearing which supports the shank 54.

The latter form of the invention provides modified means for limiting operating movement of the expanders 18 and 20 and for holding the collet 10 in a predetermined contracted position. In this connection it will be observed that the face plate 76 is formed in the rear face thereof with a central, square recess 90 and that the shank 54 extends through this recess. A nut 92 threaded on the shank 54 is received within the recess 90, and a retainer ring 94 which covers the recess 90 around the shank 54 is fastened to the face plate 76 by screws 96.

In use, the face plate 76 is attached to a machine in any suitable or conventional manner and the drawbar is fastened to the rearwardly projecting end of the shank 54. Thereafter advancement of the drawbar moves the expanders 18 and 20 apart and permits the collet 10 to contract so as to release the workpiece 16. Conversely, retraction of the drawbar moves the front expander 20 toward the rear expander 18 and expands the collet 10 into clamping engagement with the workpiece. Forward movement of the shank 54 is limited by engagement of the nut 92 with the bottom of the recess 90 and, as in the form of the invention first described, retraction of the shank 54 is limited by engagement of the front expander 20 with the extension 60. The nut 92 is here shown to be hexagonal in form, and it will be observed (Fig. 5) that the recess 90 fits the nut sufficiently snugly to prevent the nut from rotating within the recess. The opposite sides of the recess 90 prevent the nut 92 from rotating and, as a consequence, the front expander 20 can be rotated to thread the shank 50 into or out of the nut. Another very practical advantage of this construction is that the nut 92 effectively prevents relative rotation between the collet 10 and the expanders 18 and 20. The collet 10 is never permitted to disengage the expanders 18 and 20 and the radially contractive force exerted by the collet on the expanders prevents inadvertent relative rotation therebetween. Thus, once the front expander 20 has been properly adjusted to hold the collet 10 in a desired position of minimum diameter, it cannot be changed from this position except by indexing the flat surfaces 28 around the co-operating internal surfaces 30 of the collet. As pointed out in connection with the first form of the invention, inherent resiliency of the collet resists such movement, and the resistance offered by the collet usually is sufficient to prevent inadvertent relative rotation.

In the forms of the invention hereinabove described and in other forms shown in this application, the collet is actuated by a pair of oppositely inclined pressure members. However, it will be readily apparent that the pressure members need not be inclined in opposite directions, and chucks of this type can be made using only one inclined surface. Two oppositely inclined pressure members combined and correlated with a collet in the manner hereinabove described are preferred but the other collet forms are operative and it is contemplated that any suitable or conventional equivalent means be used for expanding or contracting the collet.

For example, Fig. 6 shows a collet 98 which is similar to the collet 10 except that it is formed with front and rear inclined surfaces 100 and 102 which slope in the same direction. In the form of the invention shown, the surfaces 100 and 102 incline outwardly and inwardly and the surface 100 is inwardly offset from the surface 102. A stationary member 104 extends into and carries the collet 98 which is supported on correspondingly spaced and inclined pressure members or expanders 106 and 108. The member 104 and the expanders 106 and 108 are all formed in one piece. As in the form of the invention first described, each of the surfaces 100 and 102 is formed with an annular series of flat inclined cam surfaces which engage correspondingly arranged and inclined flat pressure surfaces 110 and 112 on the expanders 106 and 108, and the mating flat surfaces form the sole contact between the expanders and the collet. The collet is supported solely on the flat surfaces of the expanders. A drawbar 114 extends axially through the member 104, and an enlarged head 116 on the outer end of the drawbar bears against the adjacent end of the collet 98. A kerf 118 is provided in the head 116 in the same manner and for the same reason as the kerf 74 in the first form of the invention.

The member 104 is adapted in any suitable or conventional manner for attachment to a machine having the drawbar 114 or an actuating part to which the drawbar can be attached. In the latter event the drawbar is provided with a threaded end (not shown) or is adapted in any suitable manner for attachment to a drawbar actuator. In any event, however, it will be readily apparent that, when the drawbar 114 is advanced, as shown in Fig. 6, the collet 98 moves radially inwardly on the inclined pressure surfaces 110 and 112, and as it moves the collet contracts sufficiently to receive a workpiece or the like. Suitable means are provided for limiting advancement of the drawbar so as to prevent the flat internal cam surfaces of the collet 98 from disengaging the co-operating flat pressure surfaces 110 and 112. A stop for limiting forward movement of the drawbar 114 is not shown in the drawing, but it will be readily apparent that any suitable means such as the stops shown in either form of the invention hereinabove described can be employed for this purpose. Conversely, retraction of the drawbar 114 presses the head 116 against the collet and forces the latter against the expanders 106 and 108. As the collet 98 moves against the expanders 106 and 108 it slides outwardly on the pressure surfaces 110 and 112 and in doing so it expands to clamp a workpiece disposed thereon. Engagement of the head 116 with the expander 106 limits expansion of the collet 98 and consequently prevents overstressing of the collet. manifestly, the co-operating flat inclined surfaces on the collet 98 and on the expanders 106 and 108 function in the same manner to achieve the same beneficial results as the corresponding elements on the forms of the invention previously described.

The form of the invention shown in Fig. 7 is a drawbar-operated chuck having a collet 120 formed with a single internal, inclined bearing surface 122. When the collet is formed with a single bearing surface in the manner shown, it is necessary that the bearing be essentially long, and in this connection it will be observed that the surface 122 extend substantially the entire length of the collet. A stationary member 124 carries an integral expander 126 which extends into the collet and complements the internal cam surface 122. As in the forms of the invention previously described, the collet 120 is provided with an annular series of flat, inclined, cam, internal surfaces which engage complemental, flat, inclined, external pressure surfaces 128 on the expander 126. A drawbar 130 extends axially through and is slidably received by the member 124, and an enlarged head 132 on the drawbar engages the outer or forward end of the collet 120. A kerf 134 is provided in the head 132 to receive a screw driver or similar tool by means of which the drawbar 130 can be rotated. As in the form of the invention shown in Fig. 6 the member 124 is adapted for attachment to a machine having a drawbar or a reciprocable actuator to which the drawbar 130 can be connected in any suitable or conventional manner. Suitable means (not shown) are provided for advancing forward movement of the drawbar 130 and engagement of the head 132 with the expander 126 limits retraction of the drawbar.

In so far as operation of the chuck is concerned it will be readily apparent that it functions in the same manner and achieves the same beneficial results as the form of the invention shown in Fig. 6.

Figs. 8-10 show a thread-operated collet chuck embodying the invention adapted for mounting between centers as on a lathe or the like. The chuck is similar to the chuck shown in the first form of the invention, and corresponding numerals are used to designate corresponding parts in the two views. The parts of the chuck which differ from the chuck shown in Fig. 1 are identified by separate numerals.

More specifically, the rear expander 18 is solid rather than tubular in form, and it is provided with a relatively short forward extension 136 which extends into and is spaced radially inwardly from the collet 10. A shank 138 of reduced diameter is formed centrally on the extension 136, and the shank extends forwardly from the extension entirely through the collet. The front expander 20 is formed with an inward extension 140 which extends into the collet 10 and preferably is the same diameter as the extension 136. The shank 138 extends axially through the expander 20 and its extension 140, and an expander nut 142 is mounted on the threaded end of the shank 138 which projects beyond the expander 20.

As shown, the nut 142 bears against the end of the expander, and when it is tightened on the shank 138, it slides the expander 20 in the direction of the expander 18 to expand the collet 10. Conversely, when the nut 142 is loosened on the shank 138, it permits the expander 20 to retract and to release the collet 10 so that the latter is free to contract. Inward movement of the nut 142 is limited by engagement of the extensions 136 and 140, and it will be apparent that these extensions also serve as expansion stops to limit radial expansion and consequently overstressing of the collet 10. Outward movement of the nut 142 is limited by a stop nut 144. The particular stop nut 144 here shown is inwardly inclined, and it fits into a correspondingly inclined socket 146 in the nut 142. Also, the stop nut 144 is split radially as at 148, and a flat surface 150 is provided on the nut at opposite sides of the split. By reason of the split 148 the nut 144 can be made slightly undersize so that it expands radially when threaded on the shank 138. Expansion of the stop nut in this manner causes it to grip the shank exceedingly tightly so that it provides a particular effective means for limiting the expansion nut 142. When the nut 144 is rotated by a wrench positioned to engage the flat surface 150 the wrench tends to expand the nut so that it can be easily turned on the shank 138. However, as soon as the nut is released by the wrench, it grips the shank exceedingly tightly so that it can not be readily moved through inadvertence during use or operation of the chuck. When the nut 142 is backed against the stop nut 144 it permits the front expander 20 to move outwardly on the shank 138 so as to release the collet 10 and to permit the latter to contract so as to disengage a workpiece 16 mounted thereon. The expander 18 is here shown formed integrally on an arbor shaft 152, and both the shaft and the shank 138 are formed with aligned tapered end sockets 154 and 156 which are adapted to receive the live and dead centers of a lathe or the like. It will be readily appreciated that the collet 10 and the expanders 18 and 20 are provided with complemental flat inclined surfaces which remain always in engagement over the entire contacting surfaces thereof during operation and use of the chuck so as to prevent dirt and other foreign particles from entering between the collet and the expanders.

All forms of the invention hereinabove described have been internal chucks. These chucks are adapted to fit into a hole in a workpiece and they clamp the workpiece by expanding against the annular wall of the hole. Figs. 11–13 show how the concepts of this invention are adapted to an external chuck. In this form of the invention the workpiece is inserted into the collet and the latter is contracted to clamp the outside of the workpiece.

More particularly, the external chuck comprises a collet 160 having oppositely outwardly inclined external surfaces 162 and 164. A plurality of circumferentially spaced flat surfaces 166 are formed on the bearing surface 162, and a similar number of flat surfaces 168 are formed at spaced intervals around the bearing surface 164. As shown in Fig. 13, the flat surfaces 166 and 168 preferably are located at the ends of the collet slots so that the flat surfaces 166 are staggered with respect to the flat surfaces 168.

The collet 160 is carried by a pair of pressure members 170 and 172 which act thereon to contract the collet into clamping engagement with a workpiece (not shown) disposed within or extending into the collet. The pressure member 170 is annular in form, and it is disposed around the outer portion of the collet 160. An inclined internal surface 174 on the pressure member 170 complements the surface 162 of the collet, and the surface 174 is provided at spaced intervals therearound with flat pressure surfaces which bear on corresponding cam surfaces 166. The pressure member 172 is similarly provided with an inclined surface 176 which complements the cam surface 164 of the collet, and the pressure surface is provided at spaced intervals therearound with flat pressure surfaces or areas which flatly engage corresponding flat cam surfaces 168.

Both pressure members 170 and 172 fit snugly within a sleeve 178 and the outer pressure member 170 is confined by a retaining ring 180 threaded on the sleeve and held in a selected axially adjusted position by a lock nut 182. The collet 160 is contracted to clampingly engage a workpiece disposed therein by inward sliding movement of the sleeve which acts through the retaining ring 180 to force the outer pressure member 170 against the collet. Thus, the pressure member 170 moves with the sleeve 178, and as it moves it exerts pressure on the collet to contract the same. Movement of the pressure member 170 in this direction, and consequential overstressing of the collet, is limited by interengagement of the pressure members 170 and 172.

The means for actuating the pressure member 170 in the manner described comprises a cup-shaped housing 184 which is fastened to a backing plate 186 by screws 188 to define a cylinder 190. The inner pressure member 172 also is fixed to the backing plate 186 by screws 174. A piston 192 is mounted for reciprocation in the cylinder 190, and a sealing ring 194 surrounding the piston seals the annular space between the latter and the cylinder. The sleeve 178 extends through a central opening 196 in the piston 192 and a radial flange 198 on the sleeve is received by an annular recess 200 provided in the rear face of the piston around the opening. A press fit obtains between the sleeve 178 and the hole 196 so that the piston and the sleeve move as a unit; however, if desired, the sleeve can be additionally or alternatively connected to the piston in any suitable manner as by screwing the flange 198 to the piston or by providing the flange and the recess 200 with interfitting male and female threads.

The piston 192 is advanced in the cylinder 190 by an annular series of springs 202 interposed between the backing plate 186 and the piston 192, and the ends of the springs preferably are pocketed in recesses 204 and 206, as shown in Fig. 11. When the piston 192 is advanced by the springs 202 it pushes the sleeve 178 forward to relieve pressure on the collet 160 so that the latter is free to expand and release a workpiece disposed therein. Forward travel of the piston 192 is limited by an annular stop 208 on the cylinder housing 184, and the arrangement is such that the piston engages the stop before the pressure member 170 disengages the collet 160. Thus, the collet 160 is contracted, at least slightly, at all times from the fully relaxed or open position so that the flat cam surfaces 166 and 168 never disengage and separate from the mating pressure surfaces of the pressure members 170 and 172. Manifestly, the size of the collet 160 when the piston 192 is fully advanced can be regulated and controlled somewhat by adjusting the retaining ring 180 on the sleeve 178.

The piston 192 is retracted to clamp the collet 160 on a workpiece by air pressure. In this connection, it will be observed that the backing plate 186 is provided centrally thereof with a threaded opening 210, and the opening is threaded to receive an air-supply line (not shown). The backing plate 168 is provided with peripheral openings 212 which adapt the chuck for attachment to the spindle or other part of a machine tool, and machines of this type are conventionally equipped with air-supply lines that can in turn be attached to the chuck by screwing the end of the air-supply line into the hole 210. The air-supply lines in these machines also are conventionally equipped with control valves by means of which the flow of air under pressure to the chuck can be controlled and which permit the line which supplies the chuck to be connected selectively to air pressure or to the atmosphere. Air under pressure supplied to the chuck is conducted through a passage 214 and a port 216 to the cylinder 190 ahead of the piston 192. The total force exerted on the face of the piston 192 by air under pressure in the cylinder 190 is sufficient to overcome the total resistance of the springs 202 and the various moving parts associated with the piston and to engage the collet 160 on the workpiece with the desired pressure. The passage 214 and the port 216 are sealed by sealing rings 218 and 220 carried by the inner pressure member 172 and the annular space between the sleeve 178 and the cylinder housing 184 is closed by an annular seal 222.

In operation, the springs 202 hold the piston 192 normally advanced so that the collet 160 is open to receive a workpiece. In order to clamp a workpiece in the collet 160, air under pressure is admitted to the cylinder 190 ahead of the piston 192 to retract the latter against the springs 204 and to clamp the collet 160 on a workpiece disposed therein. The collet remains clamped on the work until air pressure to the cylinder 190 is shut off. However, as soon as the air supplied to the cylinder 190 is stopped and the cylinder is connected to the atmosphere, springs 202 quickly advance the piston to open the chuck. The flat pressure surfaces of the members 170 and 172 remain constantly in engagement with the flat cam surfaces of the collet 160 and the inherent springiness or resiliency of the collet maintains pressure between these surfaces. As a consequence there is little chance for dirt or other foreign matter to work in between these surfaces and change the true concentric position of the collet.

Figs. 14 and 15 show a chuck embodying the invention adapted for internally splined parts or any similar workpiece such as an internal gear or the like. Actually any collet chuck embodying the invention can be adapted for workpieces of this type and it will be apparent that the chucks can be adapted for either internal or external splines or teeth. By way of illustration the form of the invention shown in Figs. 8–10 is modified to accommodate an internally splined workpiece 224. The chuck shown in Figs. 14 and 15 is identical to the chuck shown in Figs. 8–10 except that the latter form of the invention is equipped with a modified collet 226 in which the collet segments are formed with external splines 228 of racktooth form. In Fig. 15 each section of the collet 226 is provided with a separate spline 228, and the latter are formed to engage the internal splines 230 of a workpiece 224. When the collet 226 expands, the external splines 228 engage and clamp the internal splines 230 on the pitch diameter. The other parts of the chuck are identical to corresponding parts of the chuck shown in Figs. 8, 9, and 10, and these parts therefore are identified by corresponding reference numerals.

The spline chuck is used in the same manner as the chuck shown in Figs. 8–10 and it has all the advantages described in connection with this chuck.

From the foregoing it will be readily apparent that we have achieved the objects of the invention. We have provided a collet chuck which is uniquely constructed to essentially eliminate the major problem of conventional collet chucks, viz., improper positioning and misalignment of workpieces due to foreign matter between the collet and the pressure members. Fundamentally, this has been done by providing the collet and the pressure members with flat inclined surfaces which engage over the entire contacting areas thereof in all adjusted positions of the collet and which are never permitted to disengage or separate during operation of the chuck. The inclined flat bearing areas thus provided retain surface contact when sliding, which renders them dirt-resistant in contrast to the sliding action of conical surfaces previously employed which diminish to line contacts when moved in either direction from the true mating position. In addition, the provision of flat bearing surfaces between the collet and the pressure members adds appreciably to the strength and power of the chuck as the inclined flats act as positive drivers for heavy cuts. The gripping action obtained between the collet and the pressure members is immeasurably greater than that achieved by annular conical surfaces conventionally used. Of further significance is the fact that the inclined mating bearing surfaces between the collet and the pressure members minimize wear on the surfaces and correspondingly increase the length of accurate wear life as compared with similar tools using conical mating surfaces. We have found also that the inclined flats tend to minimize breakage of collets at the ends of the slots. This is in sharp contrast to the results obtained using conventional conical surfaces between the collet and its pressure members. Apparently the line contacts normally obtained when curved conical bearing surfaces are employed between the collet and the pressure members concentrate the load on the collet in such a way that the latter break relatively easily under load.

Having thus described the invention, we claim:

1. A chuck comprising an expandable chucking member having an annular clamping surface and an annular series of spaced, inclined, flat cam surfaces, pressure applying means having correspondingly spaced and inclined flat pressure surfaces engaging corresponding cam surfaces of said chucking member, means coactive with said members operable to maintain a predetermined preload pressure between said surfaces to hold the same together at all times, said means also adjustable to hold said chucking member in a selected, initial, radial position with the annular clamping surface thereof disposed to receive a workpiece to be chucked, and separate actuator means coactive with said members operable to increase the pressure between said surfaces selectively so as to move said chucking member radially from said initial position and into clamping engagement with a workpiece associated therewith, parts of said pressure applying means being interengageable to limit expanding movement of said chucking member.

2. A chuck comprising a collet having an annular series of circumferentially equispaced longitudinal partial slots and flat, inclined internal cam surfaces at the closed ends of said slots, whereby the cam surfaces at one end of the collet are staggered or offset circumferentially with respect to the cam surfaces at the opposite ends thereof, a pair of pressure-applying means at opposite ends of said collet each having an annular series of flat, inclined pressure surfaces engaging and complementing the cam surfaces at its respective end of the collet, and adjustable means acting through said pressure-applying means for selectively preloading said collet so as to maintain said pressure surfaces constantly in pressed engagement with said cam surfaces and to prevent dirt and other foreign particles from gaining access therebetween.

3. A chuck comprising a collet, a pair of pressure members at opposite ends of said collet movable axially relative to said collet to move the same into and out of clamping engagement with a workpiece, said collet and each of said pressure members being characterized by an annular series of flat inclined mating surfaces co-operating to translate axial movement of said pressure members into radial expansion and contraction of said collet, said surfaces remaining flatly in contact with each other in all axially adjusted positions of said pressure member so as to prevent dirt and other foreign particles from gaining access therebetween, at least one of said pressure members being rotatable relative to and independently of the other of said pressure members to adjust the collet initially to a selected diameter, means for moving at least one of said pressure members axially relative to the other of said pressure members and said collet, and stop means for limiting axial movement of said pressure members in both directions.

4. A chuck comprising coaxial collet and pressure members axially movable relative to each other to expand and contract said collet radially into and out of engagement with a workpiece, said collet and pressure members characterized by at least one annular series of spaced, flat inclined mating surfaces forming a sole contact between said collet and pressure members and remaining flatly in engagement with each other over the entire contacting areas thereof during relative axial movement between said collet and pressure members, whereby to prevent dirt and foreign particles from entering therebetween and disturbing the coaxial relation between said collet and pressure members, means for moving the collet and pressure members axially relative to each other to expand or contract said collet members, and means for limiting said axial movement in both directions.

5. A chuck comprising coaxially disposed, annular clamping and pressure members having an annular series of flat inclined mating surfaces, said surfaces being spaced apart and arranged concentrically around the axes of said members, said clamping member being radially expansible and contractible and said members being relatively axially movable to effect expansion and contraction of said clamping member, said clamping member being supported solely on the flat inclined surfaces of said pressure members and the inclined surfaces of both members remaining solidly in flat engagement over the entire contacted areas thereof during relative axial movement between the members, a mounting for said members including an axially and rotatably adjustable element coactive with said pressure member and operable to move said collet and pressure members relative to each other and also including screw threaded means coactive with said element to hold the same in a selected axially and rotatably adjustable position, and means coactive with said element to limit axial movement theerof in one direction to limit expansion of said clamping member and consequential overstressing thereof.

6. A chuck comprising a collet, annular pressure members coaxially disposed with respect to said collet and movable axially and rotatably relative to each other, said collet and said pressure members having a plurality of discrete flat, inclined mating surfaces co-operative to move said collet into and out of clamping engagement with a workpiece, and means coactive with at least one of said pressure members for limiting relative axial movement between said members in both directions.

7. A chuck comprising an annular clamping member, a pair of pressure members having a plurality of discrete, flat, inclined surfaces engaging correspondingly shaped and inclined mating surfaces on said clamping member, power means for moving said pressure members axially relative to each other, said clamping member being radially expansible and contractible and relative movement between said pressure members acting through said inclined surfaces to effect expansion and contraction of said clamping member, means for limiting axial movement of said clamping members in both directions, and means operable independently of said last-named means for adjusting said pressure members initially relative to each other.

8. A chuck comprising a collet having a series of flat inclined surfaces at each end thereof, a pair of pressure members at opposite ends of and concentric to said collet having flat, inclined, pressure surfaces engaging and complementing respective cam surfaces, means for moving at least one of said pressure members axially to expand or contract said collet through said cam and pressure surfaces including a power actuator having stationary and reciprocable parts, means connecting one of said pressure members to a stationary part of said actuator, a slidable stem on the other of said pressure members extending through said collet and said one pressure member and connected to a reciprocable part of said actuator, and means for selectively initially positioning said other pressure member so as to maintain said pressure surfaces constantly in pressed engagement with said cam surfaces to prevent dirt and other foreign particles from gaining access therebetween.

9. A chuck comprising a collet having a series of flat inclined surfaces at each end thereof, a pair of pressure members at opposite ends of and concentric to said collet having flat inclined pressure surfaces engaging and complementing respective cam surfaces, a cylinder, a piston mounted for reciprocation in said cylinder, means connecting one of said pressure members to said cylinder, a slidable and rotatable stem on the other of said pressure members extending through said collet and said one pressure member, and means threadedly connecting said stem to said piston, said piston being operable to move said other pressure member axially to expand or contract said collet, and the threaded connection between said stem and said piston being operable to adjust said other pressure member axially to initially and selectively tension said collet so as to maintain pressure between said pressure surfaces and said cam surfaces.

10. A chuck comprising a collet having a series of flat, inclined surfaces at each end thereof, a pair of pressure members at opposite ends of and concentric to said collet having flat, inclined, pressure surfaces engaging and complementing respective cam surfaces, a cylinder, a piston mounted for reciprocation in said cylinder, means connecting one of said pressure members to said cylinder, a slidable and rotatable stem on the other of said pressure members extending through said collet and said one pressure member, means threadedly connecting said stem to said piston, said piston being operable to move said other pressure member axially and acting by said movements through said cam and pressure surfaces to expand or contract said collet, and an extension on said one pressure member engageable by said other pressure member to limit reciprocation of the piston in one direction and to prevent consequential radial overstressing of said collet, the threaded connection between said stem and said piston being operable to adjust said other pressure member axially for initially and selectively tensioning said collet so as to maintain pressure at all times between said pressure surfaces and said cam surfaces.

11. A chuck comprising a collet having a series of flat inclined surfaces at each end thereof, a pair of pressure members at opposite ends of and concentric to said collet having flat inclined pressure surfaces engaging and complementing respective cam surfaces, a cylinder, a piston mounted for reciprocation in said cylinder, means connecting one of said pressure members to said cylinder, a rotatable and reciprocable stem on the other of said pressure members extending through said collet and said one pressure member, and means threadedly connecting said stem to said piston, said connecting means being operable by rotation of said other pressure member to adjust the latter axially and to maintain pressure between said pressure surfaces and said cam surfaces, pressure of said pressure surfaces on said cam surfaces and the inherent resiliency of said collet serving to maintain said other pressure member and said threaded connection in a selected, adjusted position.

12. A chuck comprising a collet having a series of flat, inclined surfaces at each end thereof, a pair of pressure members at opposite ends of and concentric to said collet having flat, inclined, pressure surfaces engaging and complementing respective cam surfaces, means for moving at least one of said pressure members axially to expand or contract said collet through said cam and pressure surfaces, an extension on one of said pressure members extending through and projecting beyond the other of said pressure members, a nut threaded on a projecting end of said extension bearing against said other pressure member and operable to selectively initially tension said collet whereby to maintain pressure at all times between said pressure surfaces and said cam surfaces to prevent dirt and other foreign particles gaining access therebetween, means holding said nut against rotation, and means forming a seat for said nut acting as a stop to limit relative axial movement between said pressure members.

13. A chuck comprising a collet having a series of flat inclined surfaces at each end thereof, a pair of pressure members at opposite ends of and concentric to said collet having flat inclined pressure surfaces engaging and complementing respective cam surfaces, means for moving at least one of said pressure members axially to expand or contract said collet through said cam and pressure surfaces, an extension on one of said pressure members extending through and projecting beyond the other of said pressure members, a nut threaded on a projecting end of said extension bearing against said other pressure member and operable to selectively initially tension said collet whereby to maintain pressure at all times between said pressure surfaces and said cam surfaces to prevent dirt and other foreign particles gaining access therebetween, a shoulder on said extension forming a stop, and a sleeve on said other pressure member surrounding said extension and engageable with said stop to limit movement of said pressure members toward each other and consequential overstressing of said collet.

14. A chuck comprising a collet having a series of flat inclined surfaces at each end thereof, a pair of pressure members at opposite ends of and concentric to said collet having flat inclined pressure surfaces engaging and complementing respective cam surfaces, means for moving at least one of said pressure members axially to expand or contract said collet through said cam and pressure surfaces, a face plate carrying one of said pressure members and having a recess therein, a slidable and rotatable stem on the other of said pressure members extending through said collet and said one pressure member and into said recess, and a nut threaded on said stem and in said recess, said recess having sides co-operating with said nut to prevent turning of the latter in said recess, whereby rotation of said other pressure member rotates said stem into and out of said nut and varies the spacing between said pressure members to selectively initially tension said collet, pressure imposed on said pressure surfaces and said cam surfaces by initial tensioning of said collet serving to hold said other pressure member in a selected adjusted position.

15. A chuck comprising a collet having a series of flat, inclined surfaces at each end thereof, a pair of pressure members at opposite ends of and concentric to said collet having flat, inclined, pressure surfaces engaging and complementing respective cam surfaces, means for moving at least one of said pressure members axially to expand or contract said collet through said cam and pressure surfaces, a cylinder, a piston mounted for reciprocation in said cylinder, a cylindrical member connecting one of said pressure members to said cylinder, and a sleeve connected to said piston and to the other of said pressure members surrounding and slidably supported by said cylindrical member.

16. A chuck comprising a collet having a series of flat inclined surfaces at each end thereof, a pair of pressure members at opposite ends of and concentric to said collet having flat inclined pressure surfaces engaging and complementing respective cam surfaces, means for moving at least one of said pressure members axially to expand or contract said collet through said cam and pressure surfaces, a cylinder, a piston mounted for reciprocation in said cylinder, a cylindrical member connecting one of said pressure members to said cylinder, a sleeve surrounding and slidable on said cylindrical member connected to said piston, and adjustable means connecting said sleeve to the other of said pressure members operable to vary the spacing between said pressure members so as to selectively initially tension or preload said collet.

17. A chuck comprising a collet having a series of flat inclined surfaces at each end thereof, a pair of pressure members at opposite ends of and concentric to said collet having flat, inclined pressure surfaces engaging and complementing respective cam surfaces, means for moving at least one of said pressure members axially to expand or contract said collet through said cam and pressure surfaces, a cylinder, a piston mounted for reciprocation in said cylinder, a cylindrical member connecting one of said pressure members to said cylinder, a sleeve surrounding and slidable on said cylindrical member connected to said piston, and a retaining ring threaded on said sleeve and bearing against the other of said pressure members, said ring being adjustable on said sleeve to vary the spacing between said pressure members and to maintain said pressure surfaces constantly in pressed engagement with said cam surfaces whereby to prevent dirt and other foreign particles from gaining access between said surfaces.

18. A chuck comprising a collect having longitudinal slots extending alternately from opposite ends thereof and defining longitudinal collet segments, at least certain of said collet segments being provided on one side thereof with longitudinal ribs of rack-tooth form and on the other side thereof with flat, inclined cam surfaces, pressure-applying means having flat, inclined, pressure surfaces, each engaging and complementing a respective one of said cam surfaces, adjustable means acting through said pressure-applying means to selectively preload said collet so as to maintain said pressure surfaces constantly in pressed engagement with said cam surfaces and to prevent dirt and other foreign particles from gaining access therebetween, and means for selectively varying the pressure between said pressure surfaces and said cam surfaces to expand and contract said collet into and out of clamping engagement with a workpiece.

References Cited in the file of this patent

UNITED STATES PATENTS

| | | |
|---|---|---|
| 2,120,198 | Blazek et al. | June 7, 1938 |
| 2,403,136 | Stoner | July 2, 1946 |
| 2,601,419 | Spahn | June 24, 1952 |